United States Patent Office.

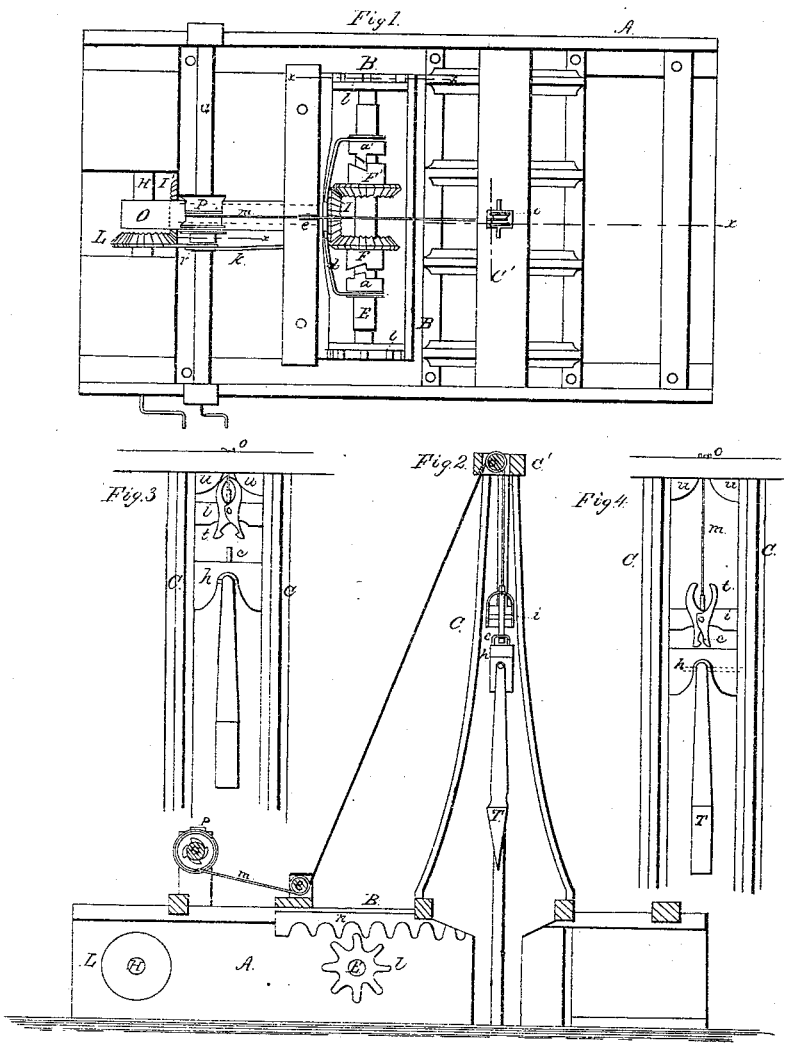

W. H. BUTLER, OF CHICAGO, ILLINOIS.

Letters Patent No. 68,411, dated September 3, 1867.

---

IMPROVED MACHINE FOR LOOSENING EARTH TO BE EXCAVATED OR REMOVED.

---

*The Schedule referred to in these Letters Patent and making part of the same.*

---

TO ALL WHOM IT MAY CONCERN:

Be it known that I, W. H. BUTLER, of Chicago, in the county of Cook, and State of Illinois, have invented certain new and useful improvements in Machine for Loosening the Earth; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention has for its object the breaking up of the hard subsoil or strata of earth preparatory to removing of it by the dredge or by hand.

Figure 1 is a top plan view.

Figure 2, a longitudinal vertical section on the lines x x of fig. 1; and

Figures 3 and 4 are front elevations of a portion of the same.

I construct a main frame, A, of any suitable size, and within or upon it locate a frame, B, arranged to slide longitudinally thereon. Transversely of the main frame A is located a shaft, H, on each end of which is secured a pinion, i, arranged to gear into a rack, n, secured to the sides of the sliding-frame B. On this shaft E are located two loose bevel-gear F and F', which engage with a corresponding gear-wheel, I, secured to the end of a longitudinal shaft, to the opposite end of which is secured a similar bevel-wheel, I', which latter is driven by another bevel-gear, L, mounted on another transverse shaft, H, mounted in the main frame. On the shaft E are arranged two sliding-clutches a and a', which engage with the bevel-wheels F and F', as represented in fig. 1, the two clutches being connected by a rod, d, so that when one clutch is thrown into connection with its gear the opposite clutch is disconnected, and *vice versa*, a lever, O, serving to operate or move the clutches as may be desired. By these means the sliding-carriage or frame B may be moved either forward or backward, as desired. On the frame B is mounted a series of uprights, C, held together at the top by a cross-bar, C'. Between these uprights C is arranged a cross-head, h, which slides vertically in grooves, and which has pivoted to it a heavy metallic bar, T, having its lower end made wedge-shaped, as shown in fig. 2. Another cross-head, i, having a pair of jaws, t, pivoted to it, as shown in figs. 3 and 4, is arranged to slide between the uprights C, and is suspended by a cord, m, passing over a pulley, o, mounted in the cross-bar C', said cord passing from thence down under another pulley, e, and back around a drum, P, on shaft G. The jaws t are arranged to grasp a staple, c, secured to the cross-head h, so that, when the cord is wound on the drum P, the chisel T will be raised until it arrives at the top of the uprights, when the projecting ends of the jaws t will be forced inward by the inclines u, by which they will be made to release their hold on the staple c, when the bar or chisel T will descend by its gravity. A clutch, r, is arranged on the shaft G, to be operated by a lever, k, so that when the cross-head i has been elevated, and the chisel released, the clutch is released from the drum P, which, revolving loosely on the shaft, permits the cord m to unwind, the weight of the cross-head i serving to unwind the cord m, and causing the cross-head to descend, so that the jaws t will again seize the staple c, ready for elevating the chisel for another blow. It will of course be understood that any number of these chisels may be arranged side by side, according to the width of the machine, the cord and cross-heads being correspondingly increased in number.

If it be desired to cut a ditch on dry land, the machine may be mounted on wheels or placed on runners; but if the object be to deepen a channel, the apparatus may be mounted on a scow or floating hull, or supported at front and rear on two boats suitably constructed and arranged for that purpose. After each stroke the frame B will be moved forward a short distance, so as to cause the chisels to strike in a new place each time, the blows being repeated in the same place if necessary. By giving to the chisels the proper weight, and elevating them to the proper height, they may be made to descend with any required force, and thus penetrate and loosen up the earth in a most effectual manner.

Having thus described my invention, what I claim, is—

1. The combination of the frame B, having the chisels T arranged therein, as described, with the frame A, provided with the mechanism for moving the frame B thereon, substantially as set forth.

2. I claim one or more chisels T, arranged to be operated as set forth, for loosening or digging up the earth preparatory to removing the same, substantially as and for the purpose set forth.

W. H. BUTLER.

Witnesses:
 ROBT. MALCOM,
 EDMUND KNAUES.